US010867068B2

(12) United States Patent
Chen et al.

(10) Patent No.: US 10,867,068 B2
(45) Date of Patent: Dec. 15, 2020

(54) PERSONAL COMPUTING DEVICES WITH ASSISTED FORM COMPLETION

(71) Applicant: GoGoody, Inc, Fremont, CA (US)

(72) Inventors: Zhuoran Chen, Fremont, CA (US); Jian Zhai, Palo Alto, CA (US); Meng-Chieh Yang, Milpitas, CA (US)

(73) Assignee: GoGoody Inc, Fremont, CA (US)

( * ) Notice: Subject to any disclaimer, the term of this patent is extended or adjusted under 35 U.S.C. 154(b) by 277 days.

(21) Appl. No.: 16/009,679

(22) Filed: Jun. 15, 2018

(65) Prior Publication Data
US 2018/0300500 A1 Oct. 18, 2018

(51) Int. Cl.
*G06F 21/62* (2013.01)
*G06F 21/60* (2013.01)
*H04L 29/08* (2006.01)
*H04L 29/06* (2006.01)
*G06F 40/174* (2020.01)

(52) U.S. Cl.
CPC ........ *G06F 21/6245* (2013.01); *G06F 21/602* (2013.01); *G06F 40/174* (2020.01); *H04L 67/02* (2013.01); *H04L 69/12* (2013.01); *G06F 2221/2107* (2013.01); *G06F 2221/2141* (2013.01)

(58) Field of Classification Search
CPC .. G06F 21/6245; G06F 40/174; G06F 21/602; H04L 67/02
See application file for complete search history.

(56) References Cited

U.S. PATENT DOCUMENTS

| | | | |
|---|---|---|---|
| 5,960,411 A * | 9/1999 | Hartman | G06Q 30/0635 705/26 |
| 6,088,700 A | 7/2000 | Larsen et al. | |
| 6,199,079 B1 | 3/2001 | Gupta et al. | |
| 6,981,028 B1 | 12/2005 | Rawat et al. | |
| 7,334,184 B1 | 2/2008 | Simons | |
| 7,343,341 B2 | 3/2008 | Bishop et al. | |
| 8,811,727 B2 | 8/2014 | Moataz | |
| 2002/0154162 A1* | 10/2002 | Bhatia | G06Q 30/06 715/745 |

(Continued)

OTHER PUBLICATIONS

NPL Search (Google Scholar) (Year: 2020).*

(Continued)

*Primary Examiner* — Mahfuzur Rahman
*Assistant Examiner* — Richard W Cruz-Franqui
(74) *Attorney, Agent, or Firm* — Richard A. Baker, Jr.

(57) ABSTRACT

A system and method for automatically completing one or a plurality of computer forms is disclosed using personal data from a local source. The form completion tool is initiated by a user to automatically complete in the one or multiple forms using personal data and code stored in user's personal computing devices. The personal data is independent of source of forms, obtained from the user with their authorization, and stored in a predefined format on the personal computing device. The code is independent of personal data and specific to each source of forms. The form completion tool may encrypt and decrypt the personal data when needed using an authentication technique to assure the identity and authority of the user to read or write the personal data.

20 Claims, 9 Drawing Sheets

(56) References Cited

U.S. PATENT DOCUMENTS

| | | | | |
|---|---|---|---|---|
| 2002/0178187 | A1* | 11/2002 | Rasmussen | H04L 63/12 715/234 |
| 2004/0006745 | A1* | 1/2004 | van Helden | G06F 9/451 715/210 |
| 2008/0172598 | A1* | 7/2008 | Jacobsen | H04L 63/12 715/224 |
| 2008/0307385 | A1* | 12/2008 | Dreiling | G06F 8/38 717/108 |
| 2008/0319899 | A1* | 12/2008 | Levchin | G06Q 20/02 705/39 |
| 2010/0131837 | A1* | 5/2010 | Lindal | G06F 11/0709 715/234 |
| 2010/0149684 | A1* | 6/2010 | Kojima | G11B 19/041 360/77.04 |
| 2011/0162078 | A1 | 6/2011 | Taveau et al. | |
| 2013/0297504 | A1 | 11/2013 | Nwokolo et al. | |
| 2014/0372319 | A1 | 12/2014 | Wolovitz | |
| 2015/0199541 | A1 | 7/2015 | Koch et al. | |
| 2017/0249592 | A1 | 8/2017 | Rossi et al. | |
| 2017/0278174 | A1* | 9/2017 | Harrell | G06Q 20/401 |
| 2018/0212956 | A1* | 7/2018 | Sanganabhatla | H04L 63/18 |
| 2020/0084225 | A1* | 3/2020 | McKendall | G06F 21/54 |

OTHER PUBLICATIONS

Mackin, Al, "Form Autofill—Unpacking the Magic", Formisimo, web page downloaded from https://www.formisimo.com/blog/form-autofill-unpacking-the-magic/ on May 29, 2018.

"More people convert with Fillr", web page downloaded from https://www.fillr.com/ on May 29, 2018.

Koch, Chris, "Fillr: Getting to frictionless digital commerce", web page downloaded from https://static1.squarespace.com/static/54cb10c3e4b0a44a770927e8/t/5989482c414fb53a1f9931f5/1502169139574/170801_Fillr_eBook.pdf on May 29, 2018.

"Hello Mona", web page downloaded from "http://www.monahq.com/" on May 30, 2018.

"Replace Traditional Search", web page downloaded from https://www.fluid.com/software/expertpersonalshopper on May 30, 2018.

Oliynyk, Alyona, "How to Develop a Personal Shopper App Based on Artificial Intelligence", web page downloaded from https://masterofcode.com/blog/personal-shopper-app on May 30, 2018.

"Stitch Fix Personal Stylist", web page downloaded from https://itunes.apple.com/us/app/stitch-fix-personal-stylist/id1022579925?mt=8 on May 30, 2018.

"DOM—Living Standard", updated May 29, 2018, downloaded from https://dom.spec.whatwg.org/ on Jun. 4, 2018.

* cited by examiner

FIGURE 4: Using Shopping Assistant Tool

PERSONAL COMPUTING DEVICES WITH ASSISTED FORM COMPLETION

BACKGROUND

Technical Field

This application relates to communication between software applications, particularly in regards to the software automation of computer forms

Description of the Related Art

English entrepreneur Michael Aldrich was a pioneer of online shopping in 1979. His system connected a modified domestic TV to a real-time transaction processing computer via a domestic telephone line. He believed that videotex, the modified domestic TV technology with a simple menu-driven human-computer interface, was a 'new, universally applicable, participative communication medium—the first since the invention of the telephone.' This enabled 'closed' corporate information systems to be opened to 'outside' correspondents not just for transaction processing but also for e-messaging and information retrieval and dissemination, later known as e-business. His definition of the new mass communications medium as 'participative' (interactive, many-to-many) was fundamentally different from the traditional definitions of mass communication and mass media and a precursor to the social networking on the Internet 25 years later. In March 1980 he launched Redifon's Office Revolution, which allowed consumers, customers, agents, distributors, suppliers and service companies to be connected on-line to the corporate systems and allow business transactions to be completed electronically in real-time. During the 1980s, Aldrich designed, manufactured, sold, installed, maintained and supported many online shopping systems, using videotex technology. These systems which also provided voice response and handprint processing pre-date the Internet and the World Wide Web, the IBM PC, and MICROSOFT MS-DOS, and were installed mainly in the UK by large corporations.

The first World Wide Web server and browser, created by Tim Berners-Lee in 1990, opened for commercial use in 1991. Thereafter, subsequent technological innovations emerged in 1994: online banking, the opening of an online pizza shop by PIZZA HUT, NETSCAPE's SSL v2 encryption standard for secure data transfer, and INTERSHOP's first online shopping system. The first secure retail transaction over the Web was either by NETMARKET or Internet Shopping Network in 1994. Immediately after, AMAZON-.COM launched its online shopping site in 1995 and EBAY was also introduced in 1995. ALIBABA's sites TAOBAO and TMALL were launched in 2003 and 2008, respectively. Retailers are increasingly selling goods and services prior to availability through "pretail" for testing, building, and managing demand.

Since then, numerous online stores and online storefront tools have been introduced to allow consumers to simply and easily purchase products online. But these tools suffered from the requirement the users enter shipping, billing, contact, and credit card information each time the user wanted to check out. AMAZON addressed this problem with the one-click buying solution described in their U.S. Pat. No. 5,960,411, incorporated herein by reference. Some companies, like PAYPAL, also have similar solutions to speed up the checkout process. But AMAZON's solution and other similar solutions stored the consumer's information on the remote servers of corporations, subjecting sensitive consumer information to security and privacy risks. One major advantage of our invention, as compared to AMAZON or PAYPAL's prior patents, is that our invention does not require consumers to put their personal information on a remote server to speed up the checkout or form completion process.

Another solution implemented by GOOGLE (and others) in their web browser provide an auto-complete functionality in the browser. As soon as the user starts filling in the form, the user is provided with a menu of completion options, which, when selected, completes the fields of the form that the software recognizes. This solution works only on a single page of a form. The process has to be repeated on subsequent pages of a multi-page checkout process.

And none of these browser auto-complete solutions work for 100% of the form fields. Instead, the best solutions only work for about 60-90% of the form fields. This is because these solutions are generalized, trying to address all possible forms. But web pages and web forms, are notoriously buggy. Modern web browsers are very forgiving of errors in syntax and context and tend to present well on the screen even if the underlying code has many errors. For software trying to interpret these forms, the errors can be impossible to navigate. This creates problems for the consumer who is attempting to complete the form quickly, as the information needs to be closely checked. The issue is even more acute on cell phones where the fonts are small and entering and editing information with fingers on a small touchscreen are painfully difficult, especially for the elder people or people with disabilities.

Clearly, there is a need to automatically complete forms that are spread across multiple screens and/or pages, especially with the form completion data stored locally on the user's computer.

SUMMARY OF THE INVENTION

A personal computing device for automatically completing one or multiple forms, is described herein, where the personal computing device is made up of a special purpose processor capable of running a web browser, interpreting web forms, and executing encryption algorithms, a memory structure electrically coupled to the special purpose processor, and a communications subsystem electrically connected to a network. The special purpose processor executes form completion tool code residing in the memory, where the form completion tool requests one or multiple web pages including one or multiple forms from a remote server via the communications subsystems and the network, and controls the web browser to automatically places values in the one or multiple forms using information derived from user's personal data, and in the correct order, where the one or multiple forms comprises one or a plurality of pages requiring personal data. The personal data is obtained from and stored in a predefined format and location. For instance, personal data is data entered into a form and saved for use in other forms. These forms typically have form fields (e.g. places on the form) where various values (e.g. form values) can be entered into the form, often for subsequent storage and processing. Personal data may include name, address, phone numbers, email, credit card numbers, passport information, personal preference data like choices of food, color, size, etc. The personal data saved in memory is independent of web forms or web pages. The form values are derived from personal data, but they may not be identical or even look similar to personal data. The form completion tool can access to a repository of form handling code specific to web pages. Both the form completion tool and form handling code are independent of individual users in that they contain no personal data and they are independent of individual users. The form completion tool can access personal data but cannot directly manipulate web pages, whereas the form handling code can manipulate web pages but cannot access personal data. The form handling code, hereinafter referred to as skeleton code, in itself is not executable by the special purpose processor. The form completion tool blends together skeleton code and personal data outside of the web browser and runs the blended code inside the web browser to populate web forms, as discussed below.

The personal data could be stored as encrypted data in the memory, in which case de-encryption of this personal data may later be needed. A user may be required to complete a local authentication process before authentication process could decrypt the personal data that is stored in the memory as encrypted data. The personal computing device could be a mobile phone, a personal computer, a smartwatch, an electronic device with processor and local memory. The web page could be a government's application form, a university's application form, a merchant's online storefront to order goods, music, video, games, or services, or a cooptation's form to request information or services, or another multiple-page form.

A method for automatically completing multiple forms using a form completion tool is described using the following steps. First of all, selecting, by a user on a user interface on a personal computing device, one specific or multiple web pages containing the one or multiple forms, wherein the personal computing device comprises a special purpose processor, the special purpose processor capable of running a web browser, interpreting web forms, and executing encryption algorithms, memory electrically coupled to the special purpose processor, the user interface electrically coupled to the special purpose processor, and a communications subsystem electrically coupled to the special purpose processor, said communications subsystem connected to a network. Initiating, by the user in the second step, the automatic completion of one or multiple forms on the specific web page or pages. Thirdly, identifying, by the form completion tool, values to be filled into specific web form or forms associated with the specific web page or pages using personal data stored in the memory. And finally transferring the specific form values over the network using the communications subsystem, wherein the specific form values are associated with one or multiple forms. These specific form values are derived from personal data, but they may not be identical or even not look similar to personal data. Personal data may include name, address, phone numbers, email, credit card numbers, passport information, personal preference data like choices of food, color, size, etc. The personal data saved in memory is independent of web forms or web pages. The form completion tool can access to a repository of form handling code specific to web pages. In one embodiment, both the form completion tool and form handling code are independent of individual users in that they contain no personal data and they are independent of individual users. The form completion tool can access personal data but cannot directly manipulate web pages, whereas the form handling code can manipulate web pages but cannot access personal data. The form handling code, hereinafter referred to as skeleton code, is not executable in itself by the special purpose processor. The form completion tool blends together skeleton code and personal data outside of the web browser and runs the blended code inside the web browser to populate web forms, as discussed below.

The method could further comprise the decryption of encrypted personal data stored in the memory. A possible step includes authenticating a user before decrypting the personal data that is stored in the memory as encrypted data, and perhaps before transferring the form values over the network. The personal computing device could be a mobile phone, a computer, a smartwatch, or an electronic device with a processor and local memory. The web page could be a government's application form, a university's application form, a merchant's online storefront to order goods, music, video, games, or services, or a corporation's form to request information or services, or another multiple-page form.

DETAILED DESCRIPTION OF THE INVENTION

There is a need in the computer forms processing field for a solution to the automatic processing of multiple page forms for users. This could also be called client-side assisted form completion. These forms could be for a passport or visa application. Another example could be the forms for incorporating a business. Or they could be the checkout process for an online storefront.

There has been a lot of form-filling software which is intended to cover all kinds of web forms (government forms, insurance forms, surveys, etc.) They typically use textual hints and statistically information to cover as much web pages as possible. These heuristic methods have disadvantages of making mistakes like filling a 'first name' field using one's full name. And they may cover some fields but not all fields in a web form. These disadvantages make them unfit for some tasks when accurate information is critical, or when fully automation is desired. The invention described herein can guarantee 100% accuracy and 100% coverage of all input fields. We do it by inspecting web pages containing web forms, case by case, and extract the form completion logic using a programming language or equivalents. Besides accuracy and coverage, this effort results in extra layer of security. E.g. a user using other form-filling software may be fooled to give their personal information to a phishing website. This is prevented with the technology described herein. This approach requires inspection and coding for each website before our technology can be applied to their website, hence it is more suitable for important or frequently used web forms.

Multiple-page form completion is also achievable as a result of the 100% accurate and 100% coverage guarantee of our invention. Multiple-page form completion is not equivalent to a multiple of one-page form-filling. First, multiple of one-page form-filling needs one user's action/confirming for each page whereas our multiple-page form completion only needs user's initialization at the beginning. There are other extra steps, not obviously expected, need to be taken care of. For example, in order to ensure a smooth and uninterrupted completion of forms, all validation of personal data needs to be done at the beginning, i.e. before user's initialization of the process. The case for multiple-page form completion is why 100% accurate and 100% coverage is important. Supposing the other form-filling method have 90% chance of accurately placing values into every form field for one page, with 4-page form filling, the chance of success becomes 0.9*0.9*0.9*0.9=66%.

Figure 1:
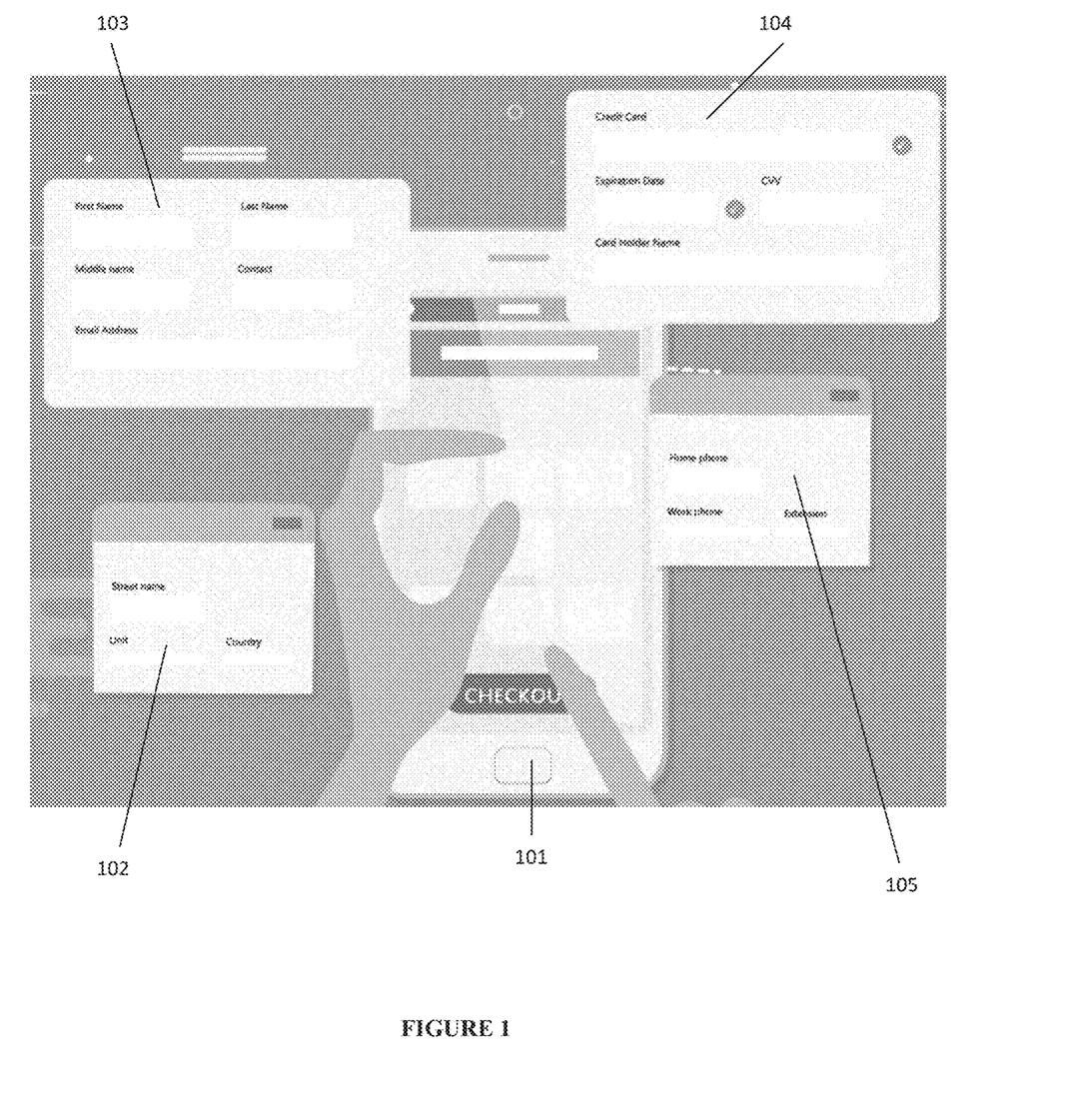
FIG. 1 is a simulated sketch of a cellphone with multiple form screens surrounding it showing the inconvenience for users to input personal information every time.

FIG. 1 shows a simulated sketch of the problem without assisted form completion. A user on a cell phone 101 tries to enter information into the multi-page form 102-105. A first page 103 requests First and Last Names, Contact and Email Address. A second page 102 requests shipping address, and a third page 104 requests credit card information. A fourth page 105 requests phone information (the data in all of these forms could be considered personal data). This is a complex problem for an application on a smart phone 101 interpret and manage. No software exists in the art which we know of can complete the forms across multiple pages with 100% accuracy. The timing of the display of the screens, the coordination of information and context across multiple screens and forms is a challenging issue for software engineers.

However, the description here explains a solution for the completion of multiple form automatic data entry. The solution starts with the setup of the application itself. The application could be coded directly to handle various types of forms in one embodiment. In another embodiment, a data structure is created that maps out how to process the forms for various known sources. For example, mapping personal data onto various forms. In still a third embodiment, a computer analyzing algorithm is used to analyze the well-known forms and to populate the data structure.

Application Setup

Figure 2:
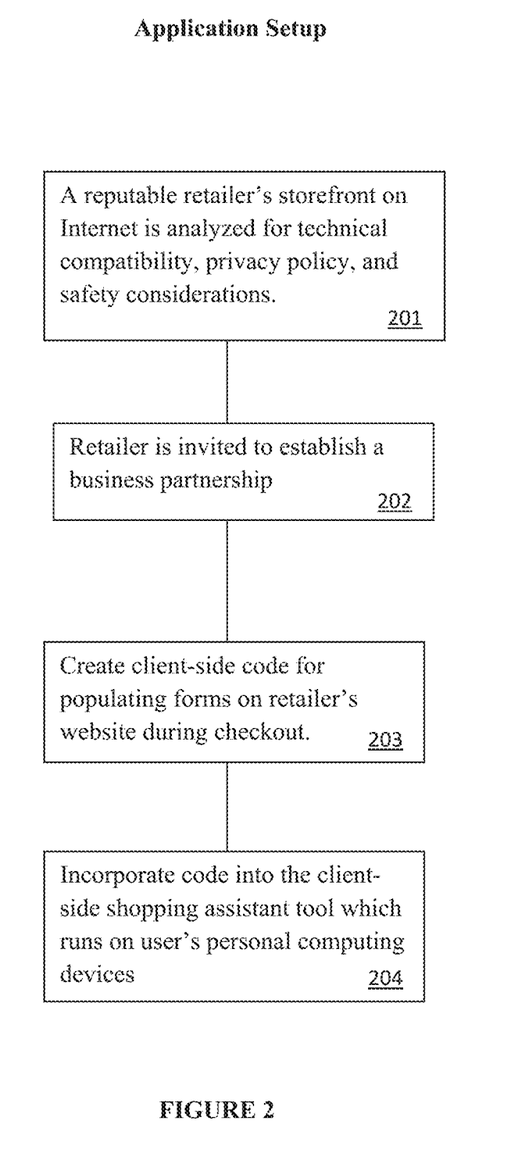
FIG. 2 is a flow chart of the setup of the application.

Looking to FIG. 2, we see the steps required in order to customize the application to process specific forms. Here, we use an online checkout scenario as an example, although this could be used for any nature of forms. First, an online retailer's storefront is identified for inclusion in the application. The identification could come from a request from a user, or the retailer could ask to be included. Once identified, the retailer's storefront is analyzed for technical compatibility, privacy policy, and safety considerations 201. The storefront code is analyzed for errors and for unusual coding constructs that require special handling. The analysis could be done with a software compiler/preprocessor, possibly with the assistance of the manual coding to handle more difficult constructs. The storefront is also analyzed to assure that there is little risk of man-in-the-middle attacks or DNS rerouting issues. The code is analyzed to make sure that all information is going solely to the desired site, and that there are no off-site URLs. In addition, the pop-up ad policy on the page is reviewed to make sure an ad is not able to redirect information designated for the form.

Next, the retailer is invited to establish a business partnership 202 with the application operator so that form information can be shared. This allows online storefront errors to be communicated back to the retailer and allows the application operator to receive information on the timing of changes to the storefront. Without update information, the application could get out of sync with newer versions of the form, causing information to be delivered to the wrong place.

Once the storefront has been analyzed, a client-side form-handling code for populating forms on the retailer's website is created 203. This could be the output of the compiler used in 201 or could be a separate software module that generates code (or tables for driving a more generic engine). The code and tables are then stored for distribution to users.

The code or tables are then incorporated into the client-side shopping assistant tool which runs on the user's personal computing devices 204. This could be incorporated into a new version of the shopping assistant tool that is updated in each personal computing device by pushing the update. Alternatively, a data structure or table regarding a form's structure could be created or updated, and the data structure/table pushed to each personal computing device. In still another embodiment, the shopping assistant tool could download the data structure and or tables for the specific form (or for all forms) on demand as the user is working on a form. One of skill in the art could also incorporate other methods of delivering specific form structure to the shopping assistant tool without deviating from the essence of this invention.

Tool Setup on Personal Computing Device

Once the application is configured to handle various forms, and the user has downloaded the tool along with some or all of the associated tables and data structures containing form specific information, the user next needs to setup the tool with user specific data. Again, we use online shopping as an example of a general technique.

Figure 3:
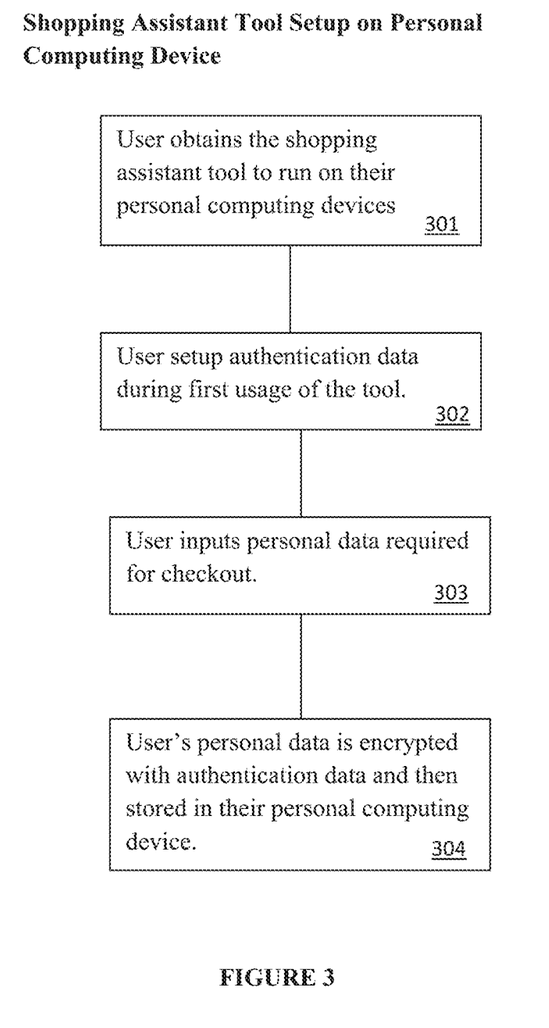
FIG. 3 is a flow chart of the user setup of the tool.

Looking to FIG. 3, the user first obtains the tool to run on their personal computing device 301. This could be by downloading the tool from a web page, from the GOOGLE Play Store, from APPLE ITUNES, of similar repository of software. The download could include just code in one embodiment or could include code and tables/data structures identifying how to handle specific forms. The download could be a single download, or a series of downloads of various sets of code and data. Once downloaded, the shopping assistant tool in installed on the device.

Next, the user could set up the authentication data during the first usage of the shopping assistant tool 302. The authentication could be a numeric code, an alphanumeric code, facial recognition, fingerprint recognition, voice recognition, keystroke pattern recognition, fob authentication into a port of the personal computing device, use of the camera to view an identification document (or image or physical item), or any other authentication methodology.

Once the authentication is set up, the user inputs personal data once, using a predefined format. The data will be used later for the completion of all kinds of different forms 303. This data may include such entities as passport number, name, address, citizenship if the forms related to visas and passports. The data may also include entities like contact information, credit card numbers, phone numbers, street name of an address, preferred shipping method, and other billing information for an online store. Each entity has a unique name and the input value of the entity (i.e. entity value) must conform to a predefined format. For example, when user inputs credit card information, they need to split the information into multiple entities with names such as "ccType", "ccNumber", "ccExpireYear", and "ccExpireMonth". In cases where there is possible ambiguity with an entity's value, the user must input in a predefined way. For example, a user must input a numeric number for a month, like "2", instead of "Feb", "February" if the entity is expiration month of a credit card. Strict input validation can help identify and correct user's input format. The user could enter this information using the keyboard or touch screen of a personal computing device or the user could transfer this information from another computing device where it has been entered. In the case of a smartwatch, the entry of information into the device directly may be tedious, and a user may prefer to enter the data on a personal computer and then transfer the information to the smartwatch. In some embodiments, the personal data may include multiple entries for the same field, such as credit card information, where the user may want the option to use different cards for different types of purchases. This could be done by creating several different profiles that are selected on the initial form entry or there could be one (or more) master profiles and sub-profiles. For instance, John may have a master profile with contact information, shipping information, and billing information, but have sub-profiles for four different credit cards. Alternatively, Mary may have a work master profile that includes the work credit card, billing and shipping information and a separate personal profile that includes her personal credit card, home address, etc.

All of the user's personal data could be encrypted with authentication data and then stored on the personal computing device 304. In the embodiment where the personal data is entered on a different device, preferably, but not necessarily, the personal data is encrypted before transfer to the personal computing device. Of course, in such situations, devices and methods to decrypt (de-encrypt) such information is often also needed.

Web Form Completion

A possible implementation of the form completion tool consists of two parts in one embodiment. Part one is worker code which runs inside a web browser, hereinafter referred to as a worker. Part two is controller code which runs outside of a web browser, hereinafter referred to as a controller.

A worker is typically a piece of JavaScript code which can manipulate the content of web page the same way as users can type data into the web forms. It is capable of filling a text area, picking an item in a dropdown list, checking a box button, clicking the submit button, et al. However, due to security concerns, a piece of JavaScript code is strictly restricted by web browser in terms of accessing local memory outside of the browser. Therefore, by itself, a worker cannot achieve the goal of "input once, use everywhere" that is desired for a web form completion tool.

On the other side, the controller runs outside of a web browser and is usually configured to access (e.g. read or write) local memory. But it cannot directly manipulate web pages as a worker does (e.g. is not configured to manipulate web pages or web forms). To solve the problem, the controller contains a worker code generator. Looking to FIG. 7, the code generator takes as input user's personal data 701 which is independent of web pages, and a form-handling code specific to a web page 702 that is independent of user information for that specific user (e.g. may contain form fields for the user's name, but these fields start out being blank). The personal data is previously set by a user. The form-handling code is manually created by inspecting a specific web page or pages containing one or multiple forms.

Figure 7:
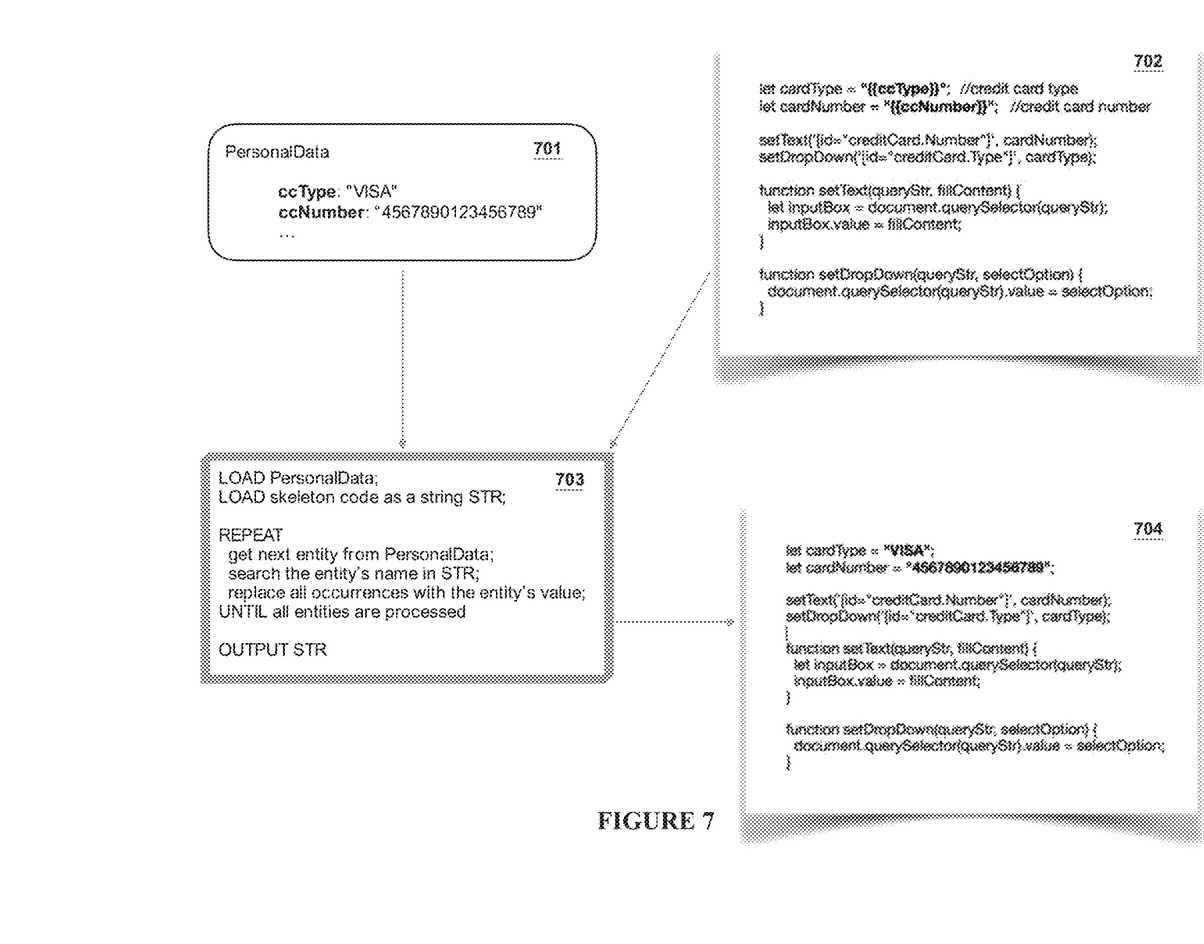
FIG. 7 uses a specific example to demonstrate how the form completion tool generates executable code using personal data independent of web pages and form handling code independent of personal data.

Code generation can be done with straightforward string replacement 703, or using a template system like Mustache, or other more complicated approaches. The output is worker code 704 which is executable inside a browser and contains user's personal data. The controller can execute worker code in a web browser and communicate with the worker through a web browser's API (application programming interface).

One of the biggest challenge in achieving the desired goal of "input once, use everywhere" is that different websites may expect different variants of user's personal data. E.g. some may ask for "Name", and some may ask a combination of "First name", "Mid Name", and "Last Name". Some websites may expect address in one input field, and some may expect the address split it into street name, city, state, zip code, and country. Some websites expect full country name whereas some expects just two-letter country name abbreviation. Some websites use text field to capture input and others may use a dropdown list for user to pick a value. The list goes on and on.

Figure 6:
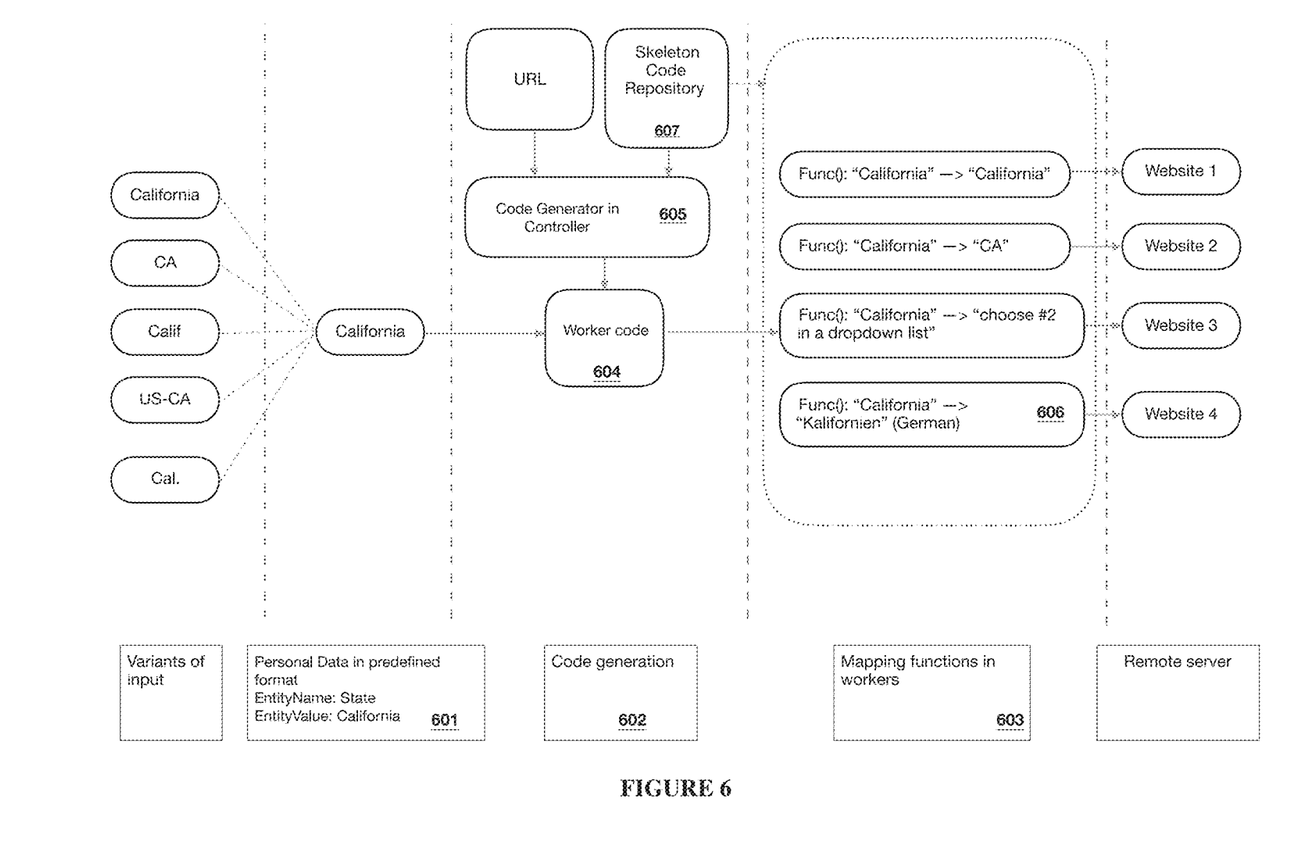
FIG. 6 uses an example to demonstrate how a specific piece of user's personal data is transformed to a desired value into a form field.

FIG. 6 shows how this challenge is solved. At the setup, user is promoted to input their personal information into several entities. Each entity is a piece of information like first name, street name, credit card expiration month. Input for each entity is validated or auto-corrected to ensure consistency across users. For example, a user must pick or input the full name of a state like "California", instead of "CA", or "Cal". The result is a list of entities with entity name and entity value 601. In the code generation step 602, the controller selects a piece of skeleton code from a repository according to the URL of the web page 607. It then merges the entities with the skeleton code 605 and creates the worker code 604. A worker consists of several functions. Each function performs a specific mapping or action using one or multiple entity values an input 606. This way, workers can be very flexible with regard to the mapping or actions they can perform. The mapping can be as simple as from a full name to its abbreviation; or it can be a translation from English to German 606; or it can be performing one or more actions on the web page like click one item, or copy and paste some text. These mapping functions are specific to the web page of the specific website 603. This technique ensures the form completion tool can have 100% coverage of the form fields. We do not find in prior art where similar technique is described. Other form-filling methods we found in prior art are mostly based on textual similarity of form field names and descriptions whereas this technique does not depend on textual similarity at all.

Figure 8:
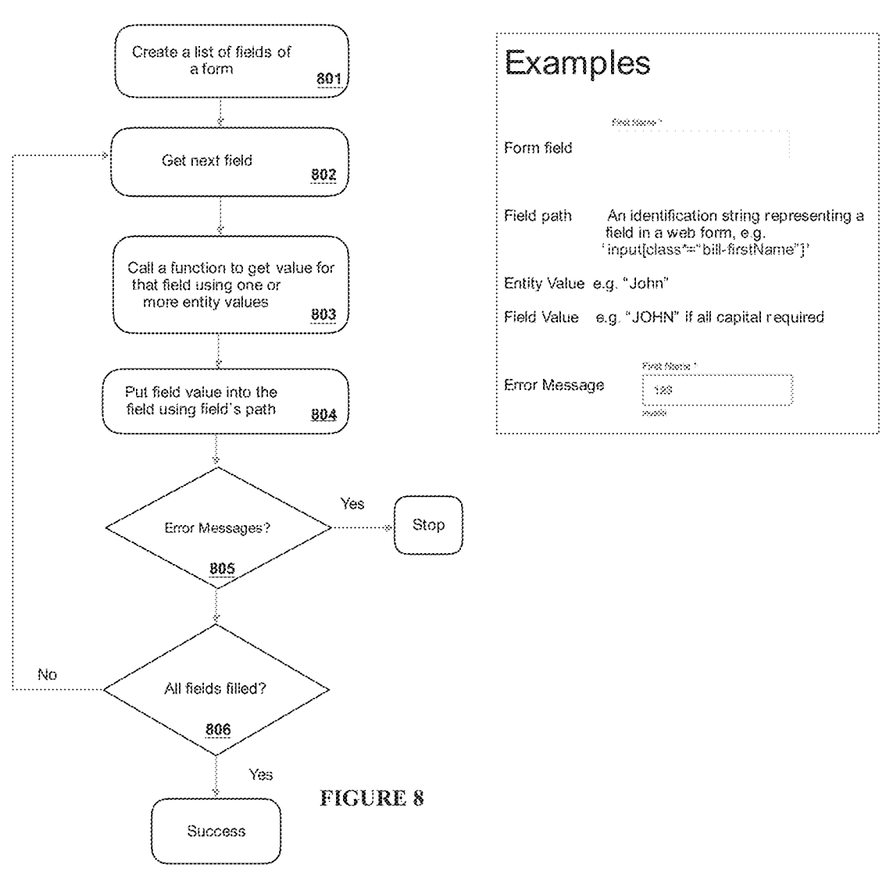
FIG. 8 shows how the form completion tool places appropriate values into form fields of one specific form.

Looking to FIG. 8, the steps a worker places appropriate values into form fields of one specific form are described. In the skeleton code, a list of required form fields is created 801. Upon execution, a worker iterates through the list 802. For each field, it calls a function to get an appropriate value for that field using one or more entity values 803. It then puts the value into the form field using field's path, which is also predefined in the skeleton code 804. Error detection and handling is necessary 805 because some form uses real time validation method for some specific fields like email address or credit card numbers. Once all required fields are processed 806, the worker stops and gives back control to the controller.

Figure 9:
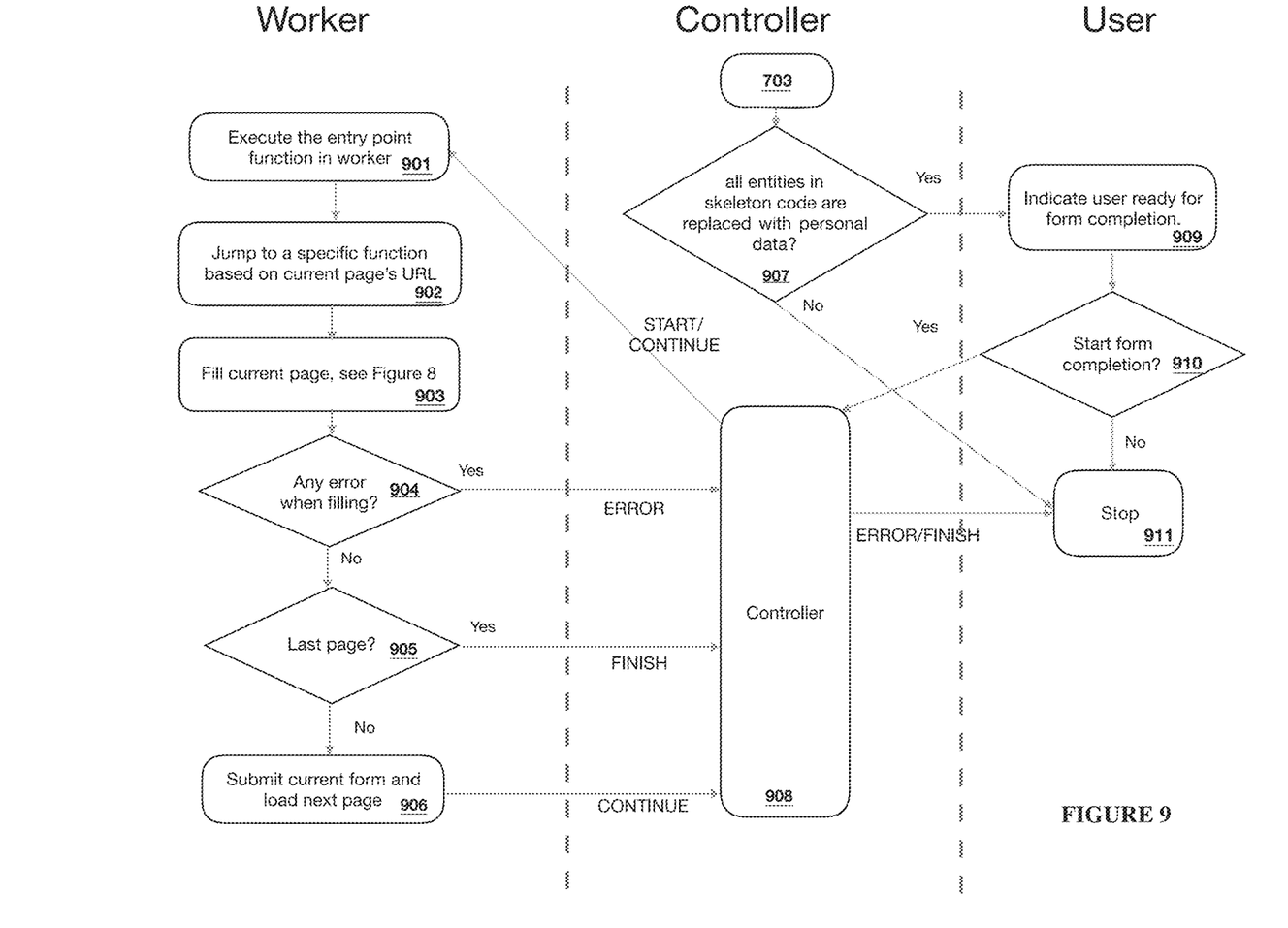
FIG. 9 shows how the tool places appropriate values into multiple-page web forms and how it interacts with users.

Looking to FIG. 9, completion of multiple-page forms is done through synchronized operations between a controller 908 and a worker. Upon generating of worker code 703, the controller 908 checks if all entities in skeleton code are replaced with personal data 907. If not, the process stops 911. Any remaining entity names in the generated worker code implies missing personal data and requires user's action. Note that in some embodiments, the entities names can be stored in the form handling code. Once all entities are replaced, the user is notified 909 and can then authorize the form completion process 910. The controller 908 then tells the browser to run the worker code. Because the controller is also independent of website, it always executes a fixed entry point function of the worker 901 and the worker itself decides where it should starts depending on the current page's URL 902. The worker then completes the current form in current web page as described in above 903. Any errors are reported to the controller 904 which could consequently notify the user 911 about the error. The worker itself decides whether the whole process involving one or multiple pages is done 905. If not, it submits current form to the remote server which typically sends back the next page 906. The controller 908 gets progress information while loading the new page. Upon page loading completion it can run the worker in the browser again. When the worker reports to the controller that the last page is loaded and form completion is done 905, the controller 908 could report the information to the user and give back the control to the user. At this time, the user may review the forms, make any changes as desired, and submit or cancel the form submission. Alternatively, the worker may go ahead to submit the form in the last page as well, hence the user only needs one-time authorization at the beginning of the process. This alternative way is useful for low-value order forms like purchasing a song or downloading a game which costs only one dollar or two.

Further automation of generating the skeleton code 702 is possible. In other embodiments, the owner of the website may generate the skeleton code by themselves and submit the code for inclusion in the skeleton code repository 607 after review and verification by the operator of the form completion tool.

By combining these components described above, we make this assisted form completion tool possible.

Use Case: Using Form-Completion for a Shopping Application

We continue the online shopping example here, as an example of the general technique.

Figure 4:
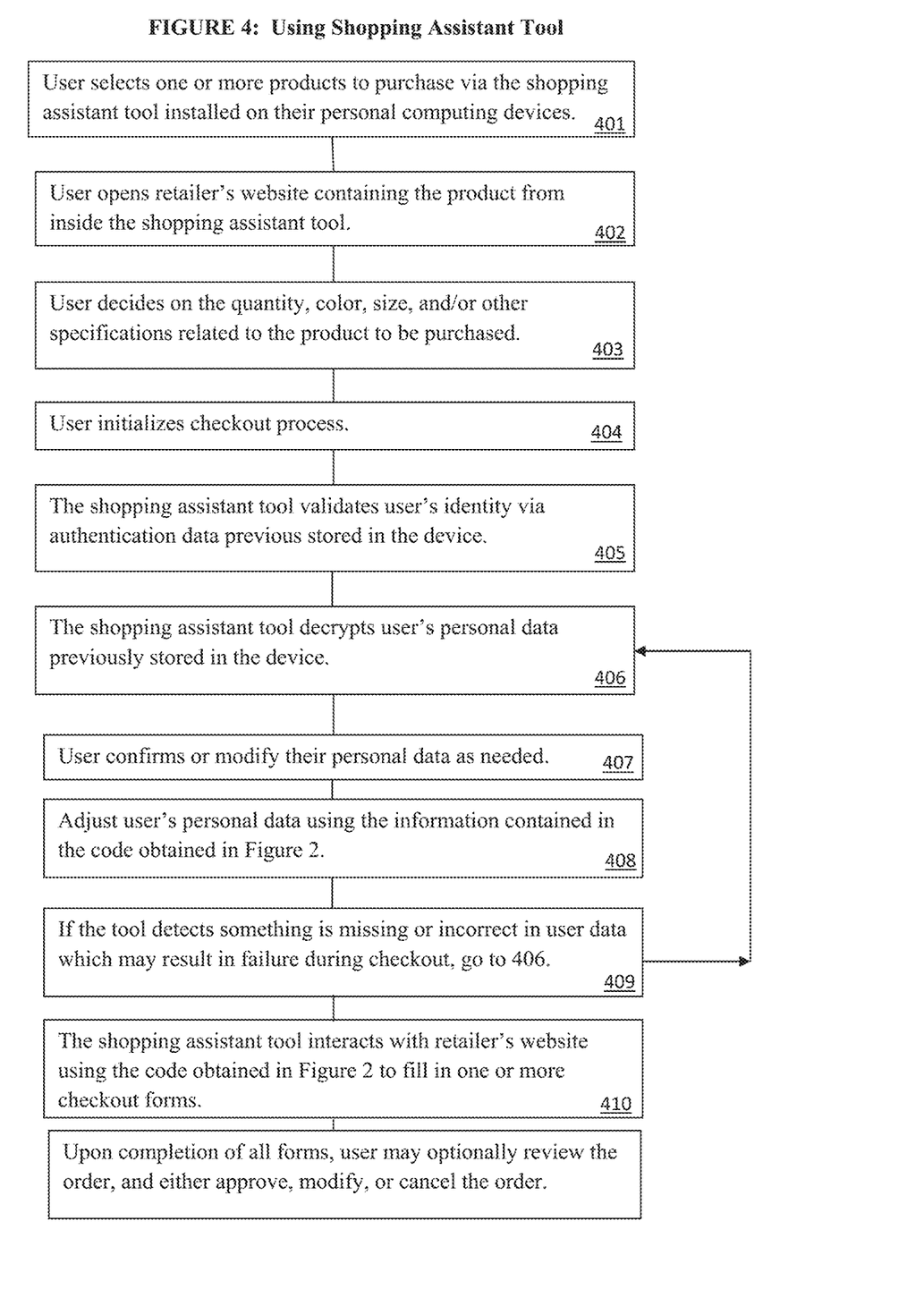
FIG. 4 is a flow chart for the operation of the tool for online shopping.

Looking to FIG. 4, we see the tool configured for a shopping application. The user could start the online shopping application using the operating system of the personal computing device. The user then selects one or more products to purchase via the shopping application 401. The shopping application may operate as a personal shopping assistant for the user, learning about the user's preferences, sizes, preferred colors, styles, and favorite items for purchase. The shopping application could also know to suggest outfits, with the shoes coming from one retailer, the skirt from another, the top from a third, and the accessories from still a fourth retailer. The order could then be coordinated into orders for each retailer.

The shopping application then opens a retailer's website on a remote server and loads items to order onto the retailer's online shopping cart 402. The remote server could be a single computer hosting web server software to represent the form and to collect the data from the form. In other embodiments, the remote server is a plurality of computers distributed over a geographic area where the request goes to the computer geographically located closest to the personal computing device. Values collected in the form could go to the same computer that hosts the web page or to another computer designated to collect these values.

In some embodiments, the user opens the retailer's webpage directly and enters the quantity, size, color, and other specifications related to the product to be purchased 403. In other embodiments that information is directly transferred from the shopping application to the online storefront (electronic storefront).

When the user has selected all of the purchases that were intended, the user initiates the checkout process 404. This can be done using a checkout form, or by other methods. The checkout process could be through a verbal command or through a keyboard or mouse/touchscreen command. In another embodiment, the checkout could be triggered by a change in focus on the window on the screen.

When the checkout process is initiated, the shopping application validates the user's identity using the authentication data previously stored on the personal computing device 405. The authentication methodology could include numeric code entry, an alphanumeric code entry, facial recognition, fingerprint recognition, voice recognition, keystroke pattern recognition, fob authentication into a port of the personal computing device, use of the camera to view an identification document (or image or physical item), or any other authentication methodology.

Once authenticated, the shopping assistant tool decrypts the user's personal data that was previously stored on the personal computing device 406. This personal data is then transformed into form values and then transferred over the network to the retailer's site.

Optionally, the user next reviews the form to see if the data is correct and modifies the data if necessary. If the data is modified, the user is given the option to update the personal data with the modifications 407. If the user desires to modify the personal data, the personal data is updated 408. This is done with code created in FIG. 2, steps 203, 204.

If the controller detects that one or more entities missing or incorrect in the personal data or in the form as it is being loaded that may result in errors during checkout 409, then the process returns to step 406.

Hardware Description

Figure 5:
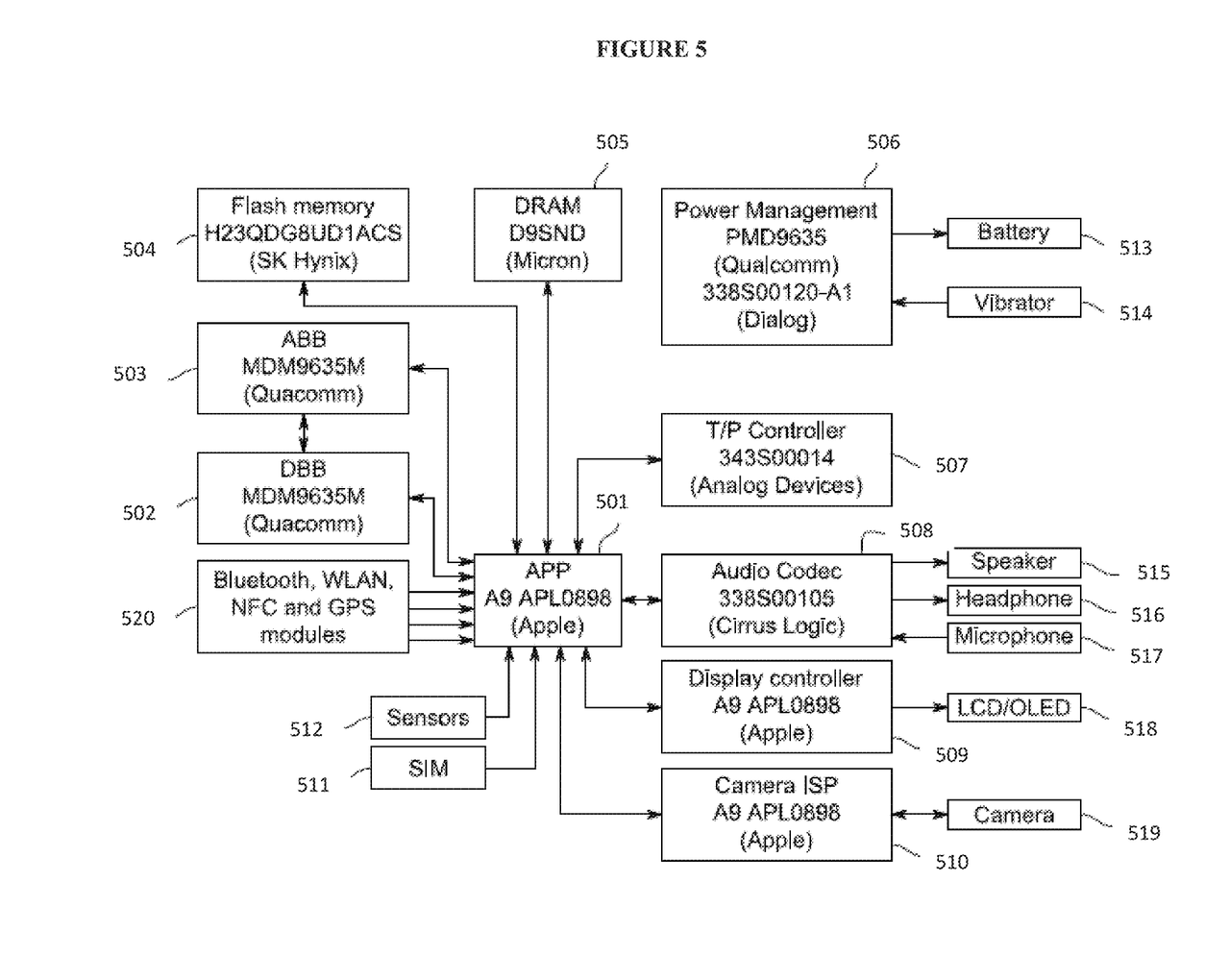
FIG. 5 is an electrical diagram of an example personal computing device with a special purpose processor.

FIG. 5 shows the electrical functional diagram of an APPLE smartphone, called the IPHONE 6S, and show the data flow between the various functional blocks. The IPHONE is one embodiment of a personal computing device. Other smartphones, personal computers, tablets, embedded computers, wearable devices, smart watches, laptops, smart televisions, and similar personal computing devices are used in other embodiments. The center of the functional diagram is the APPLE A9 64-bit system on a chip 501. The A9 501 features a 64-bit 1.85 GHz ARMv8-A dual-core CPU. The A9 501 in the IPHONE 6S has 2 GB of LPDDR4 RAM included in the package. The A9 501 has a per-core L1 cache of 64 KB for data and 64 KB for instructions, an L2 cache of 3 MB shared by both CPU cores, and a 4 MB L3 cache that services the entire System on a Chip and acts as a victim cache.

The A9 501 includes an image processor with temporal and spatial noise reduction as well as local tone mapping. The A9 501 directly integrates an embedded M9 motion coprocessor. In addition to servicing the accelerometer, gyroscope, compass, and barometer 512, the M9 coprocessor can recognize SIRI voice commands. This M9 coprocessor can be used to authenticate users using voice recognition. The A9 501 is also connected to the SIM card 511 for retrieving subscriber identification information.

The A9 501 interfaces to a two-chip subsystem that handles the cellular communications 502, 503. These chips 502, 503 interface to LTE, WCDMA, and GSM chips that connect to the cellular antenna through power amps. These chips 502, 503 provide the iPhone with voice and data connectivity through a cellular network.

In addition to the on chip memory of the A9 501, the A9 501 connects to flash memory 504 and DRAM 505 for additional storage of data.

Electrically connected, through the power supply lines and grounds, to the A9 501 and the rest of the chips 502-519 is the power management module 506. This module 506 is also connected via a data channel to the A9 501. The power management module 506 is connected to the battery 513 and the vibrator 514.

The Touch Screen interface controller 507 is connected to the A9 501 CPU. The Touch Screen controller also interfaces to the touch screen of the IPHONE. The Touch Screen can be used to authenticate the user either through fingerprint recognition, keystroke pattern recognition, or through passcode entry.

The Audio codec 508 in the IPHONE is connected to the A9 501 and provides audio processing for the IPHONE. The Audio codec 508 is also connected to the speaker 515, the headphone jack 516, and the microphone 517. The Audio codec 508 provides a high dynamic range, stereo DAC for audio playback and a mono high dynamic range ADC for audio capture. The Audio codec 508 may feature high performance up to 24-bit audio for ADC and DAC audio playback and capture functions and for the S/PDIF transmitter. The Audio codec 508 architecture may include bypassable SRCs and a bypassable, three-band, 32-bit parametric equalizer that allows processing of digital audio data. A digital mixer may be used to mix the ADC or serial ports to the DACs. There may be independent attenuation on each mixer input. The processing along the output paths from the ADC or serial port to the two stereo DACs may include volume adjustment and mute control. One embodiment of the Audio codec 508 features a mono equalizer, a sidetone mix, a MIPI SOUNDWIRE or I²S/TDM audio interface, audio sample rate converters, a S/PDIF transmitter, a fractional-N PLL, and integrated power management. In some audio codecs, digital signal processing and fast Fourier transformation functionality is available, either integrated into the sound processing or available to the CPU 501 for offloading processing from the CPU.

The A9 501 chip also interfaces to a Camera integrated signal processor 510 chip, the Camera chip 510 connected to the camera 519. The camera 519 can be used for authentication purposes, utilizing a facial recognition algorithm to authenticate the user. The camera 519 could also be used to recognize other images for authentication, for instance a passport or driver's license could be scanned for authentication.

There is also a Display Controller 509 that provides the interface between the A9 501 chip and the LCD (or OLED) screen 518 on the iPhone. The screen 518 could be used in to display shopping options and checkout information for the user to review and approve.

The wireless subsystem 520 provides connectivity to BLUETOOTH, WLAN, NFC and GPS modules. This handles all of the non-cellular communications to the Internet and to specific devices. The Bluetooth BLUETOOTH devices could include a variety of microphones, headsets, and speakers. The wireless subsystem 520 interfaces with the A9 501 chip.

The foregoing devices and operations, including their implementation, will be familiar to, and understood by, those having ordinary skill in the art.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

The invention claimed is:

1. A system for automatically completing a web form, the system comprising:
    a network;
    a remote server hosting a web page with the web form, connected to the network;
    a personal computing device comprising:
        a special purpose processor, said special purpose processor running a web browser, interpreting the web form, and executing encryption algorithms, said web form comprising a plurality of form fields for receiving form values;
        memory electrically coupled to the special purpose processor;
        a communications subsystem electrically coupled to the special purpose processor, said communications subsystem connected to the network;
        wherein the special purpose processor executes a form completion tool code residing in the memory, a portion of said form completion tool code separate from the web browser, said form completion tool code generating worker code for operating within the browser, wherein the form completion tool code requests the web page including the web form from the remote server via the communications subsystems and the network, wherein said form completion tool code maps personal data to specific form values, and automatically places, in the web form, values solely derived from a combination of a form handling code and a user's personal data stored in the memory;
        wherein the form handling code is specific to the web form on said web page; and
        wherein said user's personal data conforms to a predefined format and is independent of the web form on said web page.

2. The system of claim 1 wherein the user's personal data is organized as a set of entities and each entity comprising an entity name and an entity value and a user can individually add, modify, and remove each entity prior to form completion.

3. The system of claim 1 wherein the web form completion tool comprises:
    a controller which is computer code executed by the special purpose processor outside of the web browser;
    wherein said controller is configured to access the memory but is not configured to manipulate the web page or the web form; and
    the worker code which is computer code executed by the special purpose processor inside the web browser
    wherein said worker code cannot access the user's personal data saved in the memory but the worker code manipulates the web page or the web form, the worker code interprets entity values of the predefined format, the worker code maps the entity values to the form values, the worker code sets the form values specific to the web page containing the web form, and the worker code transmits the form values through the network.

4. The system of claim 3 wherein said worker code is dynamically generated by the controller by merging together the form handling code and the user's personal data saved in the memory.

5. The system of claim 1 wherein the user's personal data is stored as encrypted data in said memory.

6. The system of claim 1 wherein a user must complete an authentication process on the personal computing device before the user's personal data is decrypted and the authentication process decrypts the user's personal data that is stored in the memory as encrypted data.

7. The system of claim 1 wherein the personal computing device is any of a mobile phone, a personal computer, a smart watch, and an electronic device with the special purpose processor and the memory.

8. The system of claim 1 wherein the web page is any of a government's application form, a university's application form, a merchant's online storefront, and a corporation's form to request goods, services, or information.

9. The system of claim 1 wherein the web page is an entry to a plurality of related web pages containing a plurality of related web forms that the form completion tool completes in a correct order.

10. The system of claim 1 wherein the web form completion tool notifies users that one or more entities are missing from the user's personal data prior to a user authorizing form completion by comparing entity names in the user's personal data stored in the memory with the entity names stored in the form handling code.

11. A method for automatically completing a web form using a form completion tool, the method comprising:
   receiving, on a user interface on a personal computing device, a user selection of a specific web page containing the web form;
      wherein the personal computing device comprises a special purpose processor, said special purpose processor running a web browser, interpreting the web form, and executing encryption algorithms;
         said web form comprising a plurality of form fields for receiving form values;
      said personal computing device comprising a memory electrically coupled to the special purpose processor, said user interface electrically coupled to said special purpose processor;
      and a communications subsystem electrically coupled to the special purpose processor, said communications subsystem connected to a network;
   receiving instructions from the user to initiate an automatic completion of the web form on the specific web page;
   identifying, by the form completion tool, at least one specific form structure associated with the specific web page, wherein a portion of said form completion tool code is separate from the web browser, said form completion tool generating worker code for operating within the browser;
   mapping, by the form completion tool, personal data to specific form values;
   transferring said specific form values through the network using the communications subsystem, wherein said specific form values are derived from a combination of a form handling code and a user's personal data stored in the memory,
      wherein the form handling code is specific to the web form on said specific web page; and
      wherein said user's personal data conforms to a predefined format and is independent of the web form on the specific web page.

12. The method of claim 11 wherein the personal data is organized as a set of entities and each entity comprising an entity name and an entity value.

13. The method of claim 11 wherein the form completion tool comprises:
   executing a controller, which is computer code executed by the special purpose processor outside of the web browser;
      wherein said controller is configured to access the memory but is not configured to manipulate the web page or the web form; and
   executing the worker code, which is the computer code executed by the special purpose processor inside the web browser
      wherein said worker code cannot access the user's personal data saved in the memory but the worker code manipulates the web page or the web form, the worker code interprets entity values of the predefined format, the worker code maps the entity values to the form values, the worker code sets the form values specific to the web page containing the web form, and the worker code transmits the form values through the network.

14. The method of claim 13 further comprising dynamically generating said worker code by the controller by merging together the form handling code and the personal data saved in the memory.

15. The method of claim 11 further comprising encrypting the personal data saved in said memory.

16. The method of claim 11 wherein a user must complete an authentication process on the personal computing device before the personal data is decrypted and the authentication process decrypts the personal data that is stored in the memory as encrypted data.

17. The method of claim 11 wherein the personal computing device is any of a mobile phone, a personal computer, a smart watch, and an electronic device with the special purpose processor and the memory.

18. The method of claim 11 wherein the web page is any of a government's application form, a university's application form, a merchant's online storefront, and a corporation's form to request goods, services, or information.

19. The method of claim 11 further comprising completing in a correct order a plurality of related web pages containing a plurality of related web forms by the form completion tool.

20. The method of claim 11 further comprising notifying users, by the form completion tool, that one or more entities are missing from the personal data prior to a user authorizing form completion by comparing entity names in the personal data stored in the memory with the entity names stored in the form handling code.

* * * * *